United States Patent Office 3,126,371
Patented Mar. 24, 1964

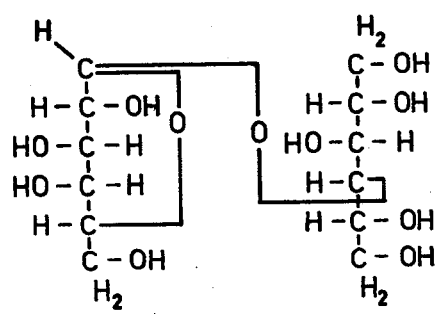
I
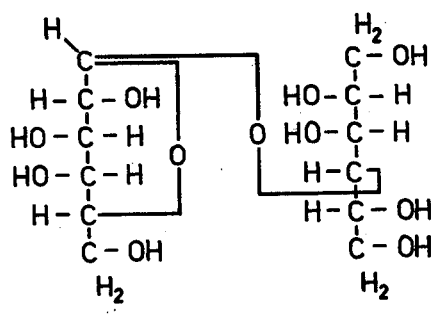
II
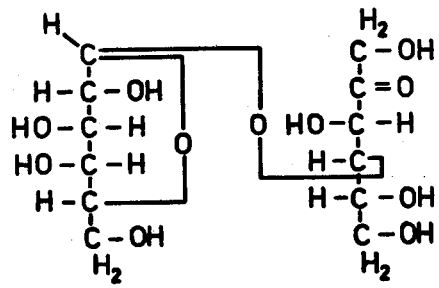
III
INVENTOR
FRIEDRICH PETUELY

3,126,371
BIFIDUS-ACTIVE GALACTOSIDOMANNITE
Friedrich Petuely, Graz, Austria, assignor to N.V. Tervalon (Maatschappij voor voedingsmiddelen op wetenschappelijke basis), Amsterdam, Netherlands
Filed May 15, 1961, Ser. No. 110,186
Claims priority, application Netherlands May 30, 1960
4 Claims. (Cl. 260—210)

It is known that lactulose has a satisfactory bifidus-activity, that is to say, that when infants not nursed at the breast are given a food preparation having a lactose (lactulose) protein quotient greater than 2.6 and containing 0.5 to 7 g. of lactulose per 70 calories, a pure or substantially pure bifidus flora is produced in the intestinal tract of the new-born children.

It has now been found that not only with lactulose but also with its hydration product, which is a mixture of lactite and lactulite, and with either of these substances food preparations for infants may be made which enable a pure or substantially pure bifidus flora to be produced in the intestinal tract.

The mixture of lactite and lactulite can either be produced by hydrogenation of an aqueous solution of lactulose with Raney nickel and hydrogen or by mixing lactite with lactulite.

The formula of lactite ($\beta$-galactosidosorbite) is given by formula I in the attached drawing, the formula of lactulite ($\beta$-galactosidomannite) is given by Formula II in this drawing and that of lactulose is given by Formula III.

Lactite is a known compound the production of which is described in a thesis of the Technische Hochschule at Brunswick, "Darstellung von Cellobiulose und Melibiulose" (Hoepke), 1958. The compounds can be produced by hydrogenation of lactose, for example with Raney-nickel and hydrogen, at a pressure of about 160 atm.

Lactulite has not yet been described in the literature. According to the invention, the compound is produced by hydrogenation of lactulose. By separating off the lactite formed in the same reaction, the lactulite can be obtained in the pure state. The hydrogenation may be carried out in the same manner as that described by Hoepke for the production of lactite. The separation of lactite from lactulite may be performed by the known methods for the separation of sugars or sugar-like compounds. Satisfactory results were obtained with chromatographic adsorption.

For the production of the preparations according to the invention, the addition to a conventional food preparation suitable for children and having a lactose-protein quotient exceeding 2.0, of from 0.5 to 3 g. of lactite or from 0.2 to 2 g. of lactulite or a mixture of both compounds per 70 calories is sufficient.

The finished food preparation should have a lactose-protein quotient between 2.0 and 8, preferably between 2.5 and 5. In general, a pure bifidus flora is produced by the daily administration to an infant of an amount of a food preparation according to the invention corresponding to 100 to 150 calories, preferably to about 120 calories, per kgm. of body weight.

In most cases a daily dose of about 12 gms. of lactite or 6 gms. of lactulite is sufficient to produce and maintain a pure bifidus flora. This small dose of lactulite is an improvement upon the use of lactulose which usually has to be used in daily amounts exceeding 6 gms. The lactite has the practical advantage that it can be more readily prepared than lactulose, inter alia owing to the formation of a smaller number of by-products.

EXAMPLE I

Method of producing lactite 250 gms. of lactose were dissolved in 170 ccs. of distilled water at a temperature of 80° C. and then introduced in an autoclave together with 12.5 gms. of Raney-nickel. Hydrogen was then introduced into the autoclave at a pressure of 120 atm., the (rotating) autoclave being heated to a temperature of from 140–150° C. During heating, the pressure increased to about 160 atm. During the treatment the pressure decreased necessitating the introduction of more hydrogen.

After about 4 hours the reaction was completed, as was apparent from the fact that the pressure remained constant. The reaction liquid was cooled and filtered. The nickel salts were removed from the green filtrate by passing it over ion exchangers. The cation exchanger used was Lewatit K.S.B. and the anion exchanger was Lewatit M1. The yield was 94%.

EXAMPLE II

Method of producing lactulite

In the same manner as described in Example I, 15 gms. of lactulose dissolved in 150 ccs. of water were reduced with a Raney-nickel catalyst. The maximum temperature used was 90° C., whilst the hydrogen pressure was maintained at about 120 atm.

EXAMPLE III

Method of producing a bifidus-active food preparation 100 ccs. of pasteurised whole milk having a fat content of 3.8% were mixed with 50 ccs. of boiled water, 8 gms. of lactose and 2 gms. of lactite. The mixture had a calorific value of about 150 calories. Infants from 0–6 months were given in the usual manner daily amounts of this food such that they received about 120 calories per kgm. of body weight. Within from 2 to 4 days, a substantially pure bifidus flora was found in the faeces of all the children.

EXAMPLE IV

In exactly the same manner as described in Example III, a food preparation was made from 100 ccs. of pasteurised whole milk, 50 ccs. of boiled water, 8 gms. of lactose and 1.5 gms. of lactulite. When this mixture was used to feed infants, a substantially pure bifidus flora was produced.

What is claimed is:
1. A method of producing a mixture of $\beta$-galactosidosorbite and $\beta$-galactosidomannite comprising hydrogenating lactulose.
2. The method of claim 1 wherein the $\beta$-galactosidosorbite is separated from the $\beta$-galactosidomannite.
3. The method of claim 1 wherein the hydrogenation is carried out with Raney-nickel and hydrogen.
4. $\beta$-galactosidomannite of the formula

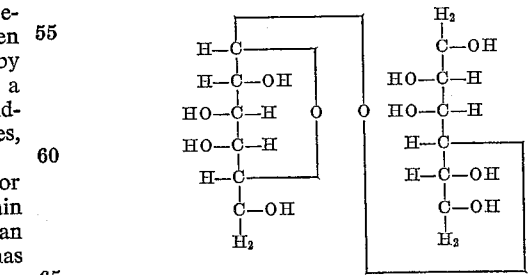

References Cited in the file of this patent
UNITED STATES PATENTS

| | | |
|---|---|---|
| 2,710,807 | Gyorgy et al. | June 14, 1955 |
| 2,715,121 | Glen et al. | Aug. 9, 1955 |
| 2,719,970 | Griffin et al. | Oct. 4, 1955 |
| 2,811,450 | Petuely | Oct. 29, 1957 |